United States Patent
Hoversten et al.

(10) Patent No.: US 9,938,818 B2
(45) Date of Patent: Apr. 10, 2018

(54) HYDRAULIC FRACTURE PERMEABILITY CHARACTERIZATION FROM ELECTROMAGNETIC MEASUREMENTS

(71) Applicant: Chevron U.S.A. Inc., San Ramon, CA (US)

(72) Inventors: Gary Michael Hoversten, Lafayette, CA (US); Michael Commer, Berkeley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 15 days.

(21) Appl. No.: 14/972,243

(22) Filed: Dec. 17, 2015

(65) Prior Publication Data
US 2016/0201447 A1    Jul. 14, 2016

Related U.S. Application Data

(60) Provisional application No. 62/103,342, filed on Jan. 14, 2015.

(51) Int. Cl.
*G01V 3/20* (2006.01)
*E21B 47/00* (2012.01)
(Continued)

(52) U.S. Cl.
CPC ............. *E21B 47/00* (2013.01); *E21B 43/26* (2013.01); *E21B 47/122* (2013.01); *G01V 3/20* (2013.01);
(Continued)

(58) Field of Classification Search
CPC ...... G01V 3/00; G01V 2003/084; G01V 3/08; G01V 3/081; G01V 3/083; G01V 3/10;
(Continued)

(56) References Cited

U.S. PATENT DOCUMENTS

2009/0166030 A1* 7/2009 Zhuravlev ............... E21B 43/26
166/250.1
2009/0242274 A1   10/2009 Chen et al.
(Continued)

FOREIGN PATENT DOCUMENTS

WO    2013/191749 A1    12/2013
WO    2014/004815 A1    3/2014

OTHER PUBLICATIONS

PCT International Search Report and Written Opinion, International Application No. PCT/US2015/066283 dated Apr. 5, 2016.
(Continued)

*Primary Examiner* — Tung X Nguyen
*Assistant Examiner* — Robert P Alejnikov, Jr.
(74) *Attorney, Agent, or Firm* — Andrew J. Lagatta; Melissa M. Hayworth; Marie L. Clapp

(57) ABSTRACT

A method and system for characterizing subsurface hydraulic fractures, specifically the effective permeability thereof, are disclosed. One method includes transmitting electromagnetic signals from an electromagnetic source toward a subsurface hydraulic fracture location, capturing electromagnetic signal measurements of a subsurface hydraulic fracture on the Earth's surface above the subsurface hydraulic fracture location at a plurality of electromagnetic receivers, and associating characteristic hydraulic flow parameters with the electromagnetic signal measurements to determine one or more fracture zones. The method further includes determining an effective permeability of the one or more fracture zones, thereby determining an effectiveness of hydraulic fracturing in the subsurface hydraulic fracture location.

11 Claims, 7 Drawing Sheets

(51) Int. Cl.
  *E21B 47/12* (2012.01)
  *E21B 43/26* (2006.01)
  *G01V 3/26* (2006.01)
  *G01V 3/30* (2006.01)
  *G01V 3/38* (2006.01)
(52) U.S. Cl.
  CPC .................. *G01V 3/26* (2013.01); *G01V 3/30* (2013.01); *G01V 3/38* (2013.01); *G01V 2210/16* (2013.01); *G01V 2210/646* (2013.01)
(58) Field of Classification Search
  CPC ... G01V 3/18; G01V 3/26; G01V 3/28; G01V 3/108; G01V 3/12; G01V 3/30; G01V 3/02; G01V 1/40; G01V 5/00; G01V 5/04; G01V 11/00; G01V 9/00; G01V 844/00; E21B 49/005; E21B 49/08; E21B 47/102; E21B 47/00; E21B 47/02216; E21B 47/0905; E21B 47/044; E21B 47/1015; E21B 44/00; G01N 33/2823; G06F 17/5009; G06F 17/50; G06F 17/509; G06F 19/00; G06F 19/701; G06F 2217/16; G05B 2219/23006; G05B 2219/32092; G05B 2219/32091; G05B 2219/32333; G06T 17/00; G06T 17/05; A61N 2005/1034; F25J 2290/10
  USPC ............... 324/323–325, 332–346; 702/6–13; 703/2, 9, 10
  See application file for complete search history.

(56) References Cited

U.S. PATENT DOCUMENTS

| 2010/0259268 | A1 | 10/2010 | Zhang et al. | |
| 2010/0313633 | A1* | 12/2010 | Anand | G01N 24/08 73/38 |
| 2011/0272147 | A1* | 11/2011 | Beasley | E21B 43/26 166/250.1 |
| 2013/0079935 | A1* | 3/2013 | Kabannik | E21B 43/26 700/282 |
| 2013/0146756 | A1 | 6/2013 | Schmidt et al. | |
| 2013/0215712 | A1* | 8/2013 | Geiser | G01V 1/288 367/9 |
| 2014/0083687 | A1* | 3/2014 | Poe | E21B 43/26 166/250.1 |
| 2014/0121972 | A1* | 5/2014 | Wessling | G01V 11/002 702/6 |
| 2014/0254317 | A1* | 9/2014 | Thompson | G01V 11/00 367/21 |
| 2014/0347055 | A1* | 11/2014 | Schmidt | G01V 3/12 324/338 |

OTHER PUBLICATIONS

Michael Commer et al., Transient-electromagnetic finite-difference time-domain earth modeling over steel infrastructure, Mar. 12, 2015, LBNL Berkeley, CA (Geophysics, vol. 80, No. 2 (Mar.-Apr. 2015)).

G. Michael Hoversten et al, Hydro-frac monitoring using ground time-domain electromagnetics, Jun. 2015, LBNL, Berkeley, CA (Geophysical Prospecting, 2015).

PCT International Preliminary Report on Patentability, International Appl. PCT/US2015/066283, dated Jul. 27, 2017, pp. 1-13.

* cited by examiner

HYDRAULIC FRACTURE PERMEABILITY CHARACTERIZATION FROM ELECTROMAGNETIC MEASUREMENTS

TECHNICAL FIELD

The present disclosure relates generally to the field of hydraulic fracture analysis. In particular, the present disclosure relates to characterization of hydraulic fracture permeability from electromagnetic measurements.

BACKGROUND

Hydraulic fracturing of reservoirs has been used in the hydrocarbon industry for over fifty years. Efficient production of hydraulically fractured reservoirs requires accurate prediction of the extent and active surface area of fractures or fracture networks that are created and/or activated. Microearthquake (MEQ) surveys are often applied to locate the occurrence of fractures and have become critical input to discrete fracture models (DFM). When hydraulic fracturing is used, a proppant is injected alongside the fracturing fluid to hold open the fracture. The proppant is typically a solid material that, when present in a fracture, will hold open the fracture, but which is gas-permeable, allowing for extraction of hydrocarbons at the site of the fracture.

Coupled geomechanical modelling and flow simulation in MEQ derived DFM models are used to predict a stimulated reservoir volume (SRV). MEQ event locations are highly dependent on a velocity model (e.g., a model built to image subsurface locations based on acoustic data) that is used. For example, SRV estimates can change dramatically when velocity models are updated. Even when MEQ event locations are accurate, by themselves MEQ events cannot determine if injected proppant has reached the MEQ event locations or if fractures associated with MEQ events are connected to the well bore. Additionally, existing fractures which may open and accept proppant may not produce a measureable MEQ event. Thus the SRV estimates which are critical for optimal well placement as well as reserve estimates can be extremely uncertain.

Existing systems have attempted to use some Electromagnetic (EM) methods to improve fracture models used in simulation. Single-borehole EM logging and crosswell EM imaging are available, but have limited spatial coverage dictated by well locations. Accordingly, improvements in both EM data acquisition techniques and modeling of subsurface fractures are desirable.

SUMMARY

In a first aspect, a method for characterizing subsurface hydraulic fractures is disclosed. The method includes transmitting electromagnetic signals from an electromagnetic source toward a subsurface hydraulic fracture location, capturing electromagnetic signal measurements on the surface above a subsurface hydraulic fracture location at a plurality of electromagnetic receivers. The new method determines an effective permeability of the one or more fracture zones created or activated by hydraulic fracturing, thereby determining the effectiveness of hydraulic fracturing in the subsurface hydraulic fracture location. The effective permeability and associating geometric characteristic parameters of the hydraulic fraction zone or zones are also determined by computer modeling (either forward or inverse) of the measured electromagnetic signal measurements. .

In a second aspect, a system for characterizing subsurface hydraulic fractures is disclosed. The system includes an electrical field generation and measurement subsystem and an electromagnetic numerical modeling system configured to utilize electromagnetic signal measurements received from the electrical field generation and measurement subsystem to determine, at least in part, the effect of a metallic casing of a hydraulic fracturing well. The system further includes an inversion software component configured to associate the electromagnetic signal measurements with hydraulic flow data, the inversion software component configured to generate a volume estimate of a fracture zone and an effective permeability of the fracture zone.

In a third aspect, a computer-readable storage device comprising computer-executable instructions is disclosed. When executed by a computing system, the instructions cause the computing system to perform a method that includes associating hydraulic flow parameters with electromagnetic signal measurements of a subsurface hydraulic fracture location to determine one or more fracture zones and determining an effective permeability of the one or more fracture zones, thereby determining an effectiveness of hydraulic fracturing in the subsurface hydraulic fracture location.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to systems and methods for characterizing subsurface hydraulic fractures, in particular using an addition of electromagnetic signal measurements from a fracturing site. In example aspects, an electrical field generation and measurement subsystem is provided to generate and measure electromagnetic signals in the area of a hydraulic fracturing site. In such aspects, an electromagnetic numerical modeling system utilizes electromagnetic signal measurements received from the electrical field generation and measurement subsystem to determine, at least in part, an effect of a metallic casing of a hydraulic fracturing well. An inversion software component associates the electromagnetic signal measurements with hydraulic flow data, and generates a volume estimate of a fracture zone and an effective permeability of the fracture zone.

Use of electromagnetic (EM) signals improve fracture models used in simulation because they can sense where conductive fluid (the conductivity coming from enhanced NaCL or KaCl content) and, particularly, conductively enhanced proppant actually go (i.e., within a hydraulic fracture). In various aspects, single-borehole EM logging and crosswell EM imaging are available, but have limited spatial coverage dictated by well locations. Surface techniques are more economic and can provide increased spatial coverage of resistivity variations, which can be related to proppant distribution if a conductively enhanced proppant is used. In addition to providing sensitivity to spatial distribution of injected fluids and conductively enhanced proppant, EM measurements can provide information about the effective permeability of the fracture zones.

Figure 1:
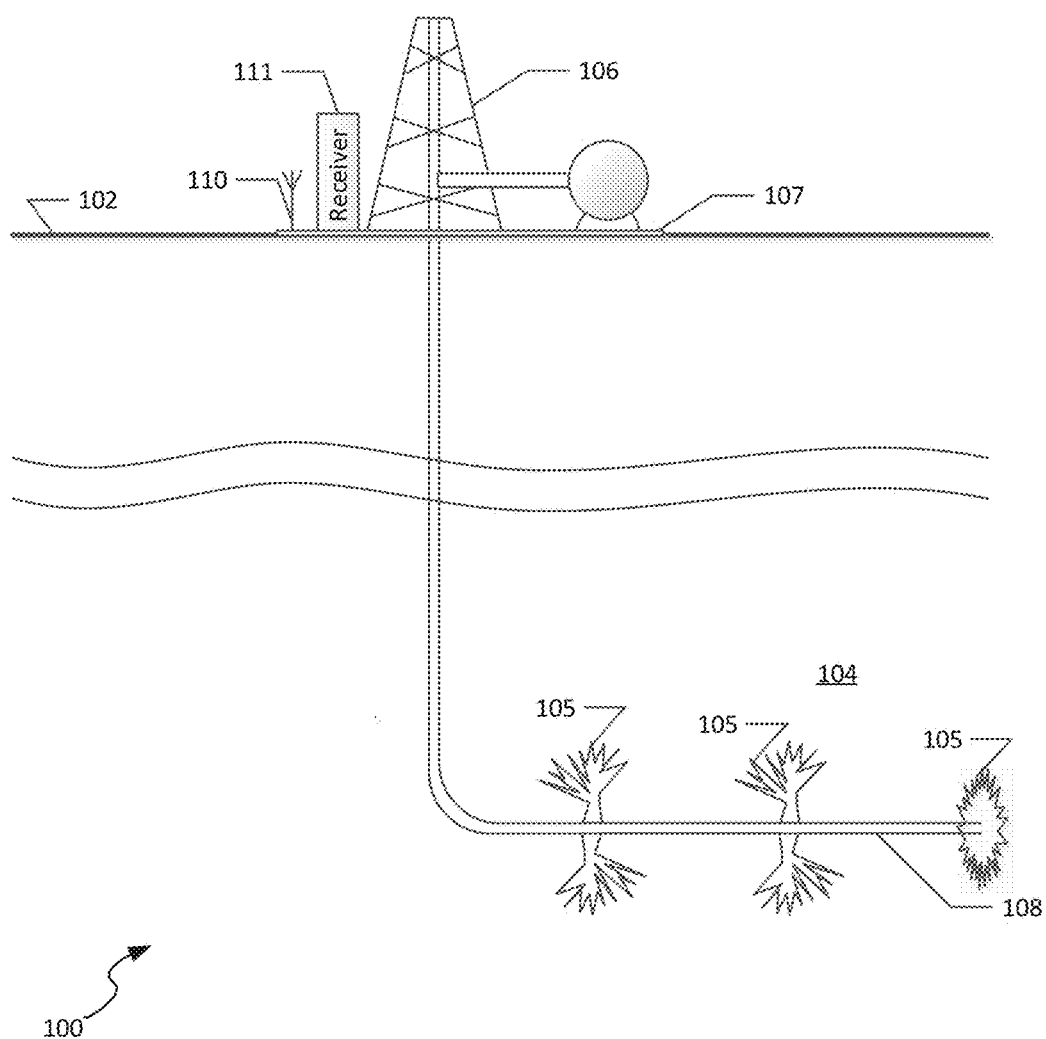
FIG. 1 illustrates an example hydraulic fracturing operation with which the systems and methods of characterizing permeability using electromagnetic measurements can be performed.

FIG. 1 illustrates an example hydraulic fracturing operation 100 with which the systems and methods of characterizing permeability using electromagnetic measurements can be performed. The hydraulic fracturing operation 100 includes a well 106 that is located at a surface location 102. The operation 100 includes a conduit 108 that extends to a subsurface hydraulic fracturing location 104.

The well 106 can be located on a surface pad 107, and can be located in proximity to one or more electromagnetic devices. In the example shown, the electromagnetic devices can include a signal generator and transmitter 110, as well as a signal receiver 111. Generally the transmitter 110 and receiver 111 can be located at surface locations, on in some cases a transmitter can be located within the conduit 108.

The conduit 108 can include, in some embodiments, a metallic casing, for example a steel casing. The metallic casing can include one or more locations at which a hydraulic fluid, as well as a proppant, can be expelled, at hydraulic fracturing locations 105 in the subsurface hydraulic fracturing location 104.

In general, in the operation 100 of FIG. 1, it can be difficult to determine, based solely on hydraulic properties, the exact size and permeability of the hydraulic fracturing locations 105. Accordingly, in some aspects of the present disclosure, a signal can be transmitted form the transmitter 110 and a response can be detected by the receiver 111, to determine an extent to which a subsurface volume has a particular density (or, conversely, a particular permeability). Although in the example shown there is a single transmitter 110 and a single receiver 111, it is noted that a variety of example layouts of signal transmitters and receivers are possible. One example of such an arrangement is discussed in connection with FIG. 2.

Figure 2:
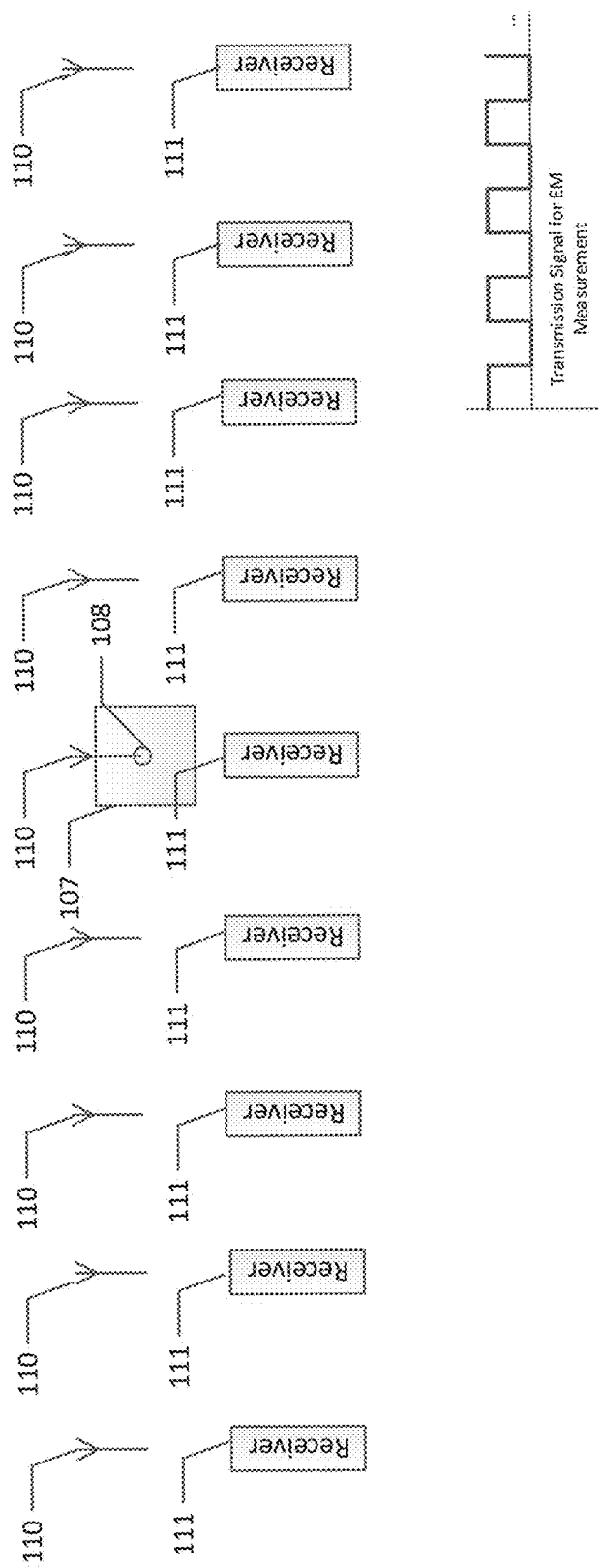
FIG. 2 illustrates an example measurement arrangement for performing surface measurements of electromagnetic signals to determine permeability of fractures in a hydraulic fracturing operation, according to an example implementation.

As illustrated in FIG. 2, an example measurement arrangement for performing surface measurements of electromagnetic signals to determine permeability of fractures in a hydraulic fracturing operation. In the example illustrated, the well 108 has a surface pad 107, for example a metallic or concrete pad supporting the well site. The arrangement includes a plurality of transmitters 110 and a corresponding plurality of receivers 111. In this arrangement, the transmitters 110 are spaced across the well site, with the well site centered around the receiver distribution. The transmitters can be spaced, for example, at −300, −200, −100, −50, 0, 50, 100, 200, and 300 meters from the well site.

The transmitter or transmitters 110 can be either an electric or magnetic dipole and the one or more receivers 111 can be any device that measure electric and/or magnetic fields. The arrangement can be situated on the ground surface over and around a hydraulic fracture process or in a bore-hole or combination of bore-holes near the fracture process. The sources and receivers can be located in any combination of ground points and borehole locations. Other spacings are possible as well.

In the example illustrated, a signal generator generates a signal to be output by the transmitters 110. In the example shown, the transmission signal is a square wave having an active period and an inactive period. In the active period, the signal is transmitted, while in the inactive period, the signal can be measured. The system is not limited to the use of a square wave, in fact any waveform with periods of current on (active) and off (inactive) can be used. Waveforms can be designed to have more power at frequencies that produce the largest response for a given target.

In addition, in alternative embodiments a number of other source-receiver configurations can be considered, other than the one illustrated in FIG. 2. A single source and a number of receivers laid out over the frac are shown in Commer, M., Hoversten, G. M., Um, E. S. . 2015, Transient-electromagnetic finite-difference time-domain earth modeling over steel infrastructure. Geophysics, Vol. 80 No. 2, E147-E162, the disclosure of which is hereby incorporated by reference in its entirety. However, the arrangement of FIG. 2 demonstrates the spatial resolution and maximum sensitivities to the hydraulic fracturing operation was found to be sortable into constant-offset so that the data can be plotted as source-receiver midpoint versus time for a given offset, as illustrated below.

Figure 3:
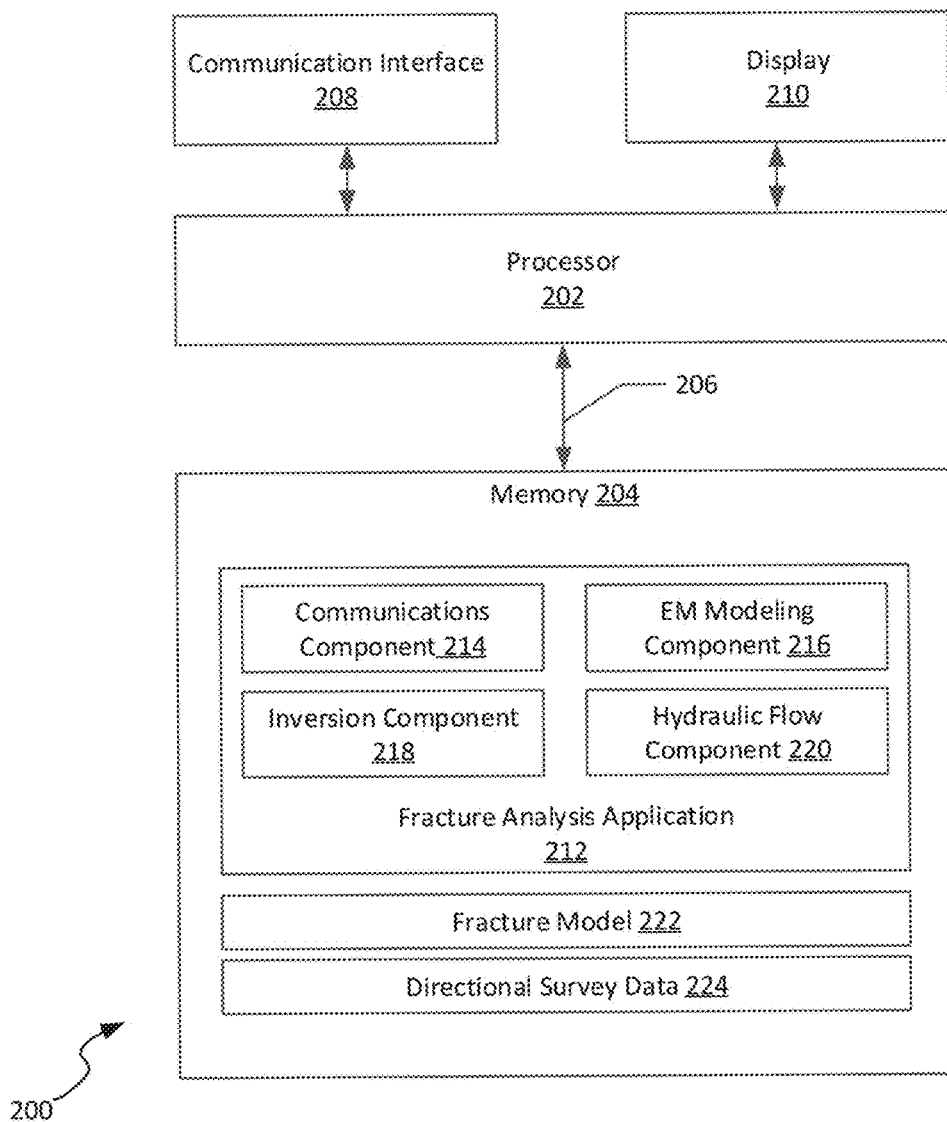
FIG. 3 illustrates a computing system useable to compute permeability of fractures in a hydraulic fracturing operation based on measured electromagnetic signals, according to an example embodiment.

Referring to FIG. 3, a computing system 200 useable to compute, through the process of inversion, permeability of fractures in a hydraulic fracturing operation based on measured electromagnetic signals is disclosed. The computing system 200 can, in example embodiments, be communicatively connected to the receivers and transmitters described in FIGS. 1-2, above, as well as information from well site 106 to develop a fracture model relating to the hydraulic fracturing operation performed by the well site 106, as well as to modify that fracture model based on electromagnetic signal measurements made from near the well site.

In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 204 stores a fracture analysis application 212, discussed in further detail below. The computing system 200 can also include a communication interface 208 configured to receive and transmit data, for example one or more data streams received from input modules 104 as seen in FIG. 1. Additionally, a display 210 can be used for presenting a graphical display of the fracture analysis application 212, viewing and editing a fracture model 222 and directional survey data received by the computing system 200.

In various embodiments, the predictive analytics application 212 includes a communications component 214, an electromagnetic modeling component 216, an inversion component 218, and a hydraulic flow component 220. The communications component 214 receives data from a hydrocarbon production operation, such as the hydraulic fracturing operation of FIG. 1, above, including hydraulic fracturing data such as an amount of injected fluid, a time period of injection, a thickness of a horizontal zone, and a depth at which the hydraulic fracturing occurs. The communications component 214 further receives data from electromagnetic receivers 111, to integrate such EM data with fracture models that are to be developed.

The electromagnetic modeling component 216 generates a conductivity earth model, and in particular an earth model that is capable of accurately modeling the effects of steel casing. The inversion component 218 is used for coupling hydraulic flow (injection and production fluid volumes, flow rates and pressure) and electromagnetic measurements to produce 3D volume estimates of the fracture zone and its effective permeability. The inversion component 218 can receive hydraulic data from a hydraulic flow component 220, which receives the hydraulic component of the data received by the communications component 214 to generate a preliminary fracture model (stored as a fracture model 222) from directional survey data 224 and hydraulic data received via the communication interface. The inversion component 218 can then modify the fracture model by limiting the extent of such fracturing to a region in which permeability is realistic based on EM readings and production data. Accordingly, the fracture analysis application 212 allows a user to modify one or more fracture models 222, for example by limiting a fracture to a particular region in which that fracture is detected based on the electromagnetic signals that are measured.

Figure 4:
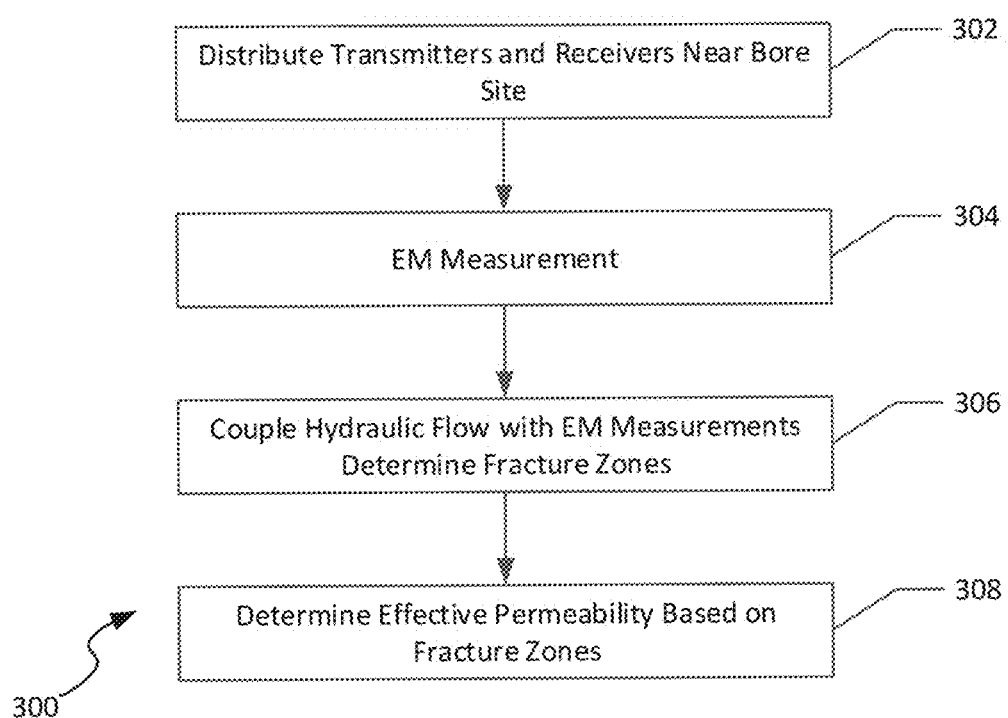
FIG. 4 is a flowchart of a method of characterizing permeability of fractures in a hydraulic fracturing operation based on measured electromagnetic signals, according to an example embodiment.

FIG. 4 is a flowchart of a method 300 of characterizing permeability of fractures in a hydraulic fracturing operation based on measured electromagnetic signals, according to an example embodiment. The method can be performed, for example, at a hydraulic fracturing site, such as is illustrated in FIG. 1, above.

In the embodiment shown, the method 300 includes distributing transmitters and receivers (step 302) in a particular arrangement in proximity of a bore site; for example, one arrangement can be as discussed with respect to FIG. 2, above.

The method 300 can include obtaining an electromagnetic field measurement at one or more locations near a bore site, or more generally in the area of a subsurface hydraulic fraction (step 304). This can be performed by, for example, transmitting electromagnetic signals from an electromagnetic source toward a subsurface hydraulic fracture location, and capturing electromagnetic signal measurements of a subsurface hydraulic fracture at the subsurface hydraulic fracture location at a plurality of electromagnetic receivers, in such embodiments.

In the example shown, the electromagnetic field measurements can be coupled to hydraulic flow data (e.g., as may be provided in a fracture model, or based solely on hydraulic flow data to create such a fracture model) to determine fracture zones (step 306). Additionally, an effective permeability in the area of the fracture zones can be determined (step 308). Coupling the electromagnetic field measurements to hydraulic flow data and determining effective permeability to establish or modify fracture models can be performed on a computing system having a fracture modeling software thereon, for example using the fracture analysis application 212 of FIG. 3, above.

Figure 5:
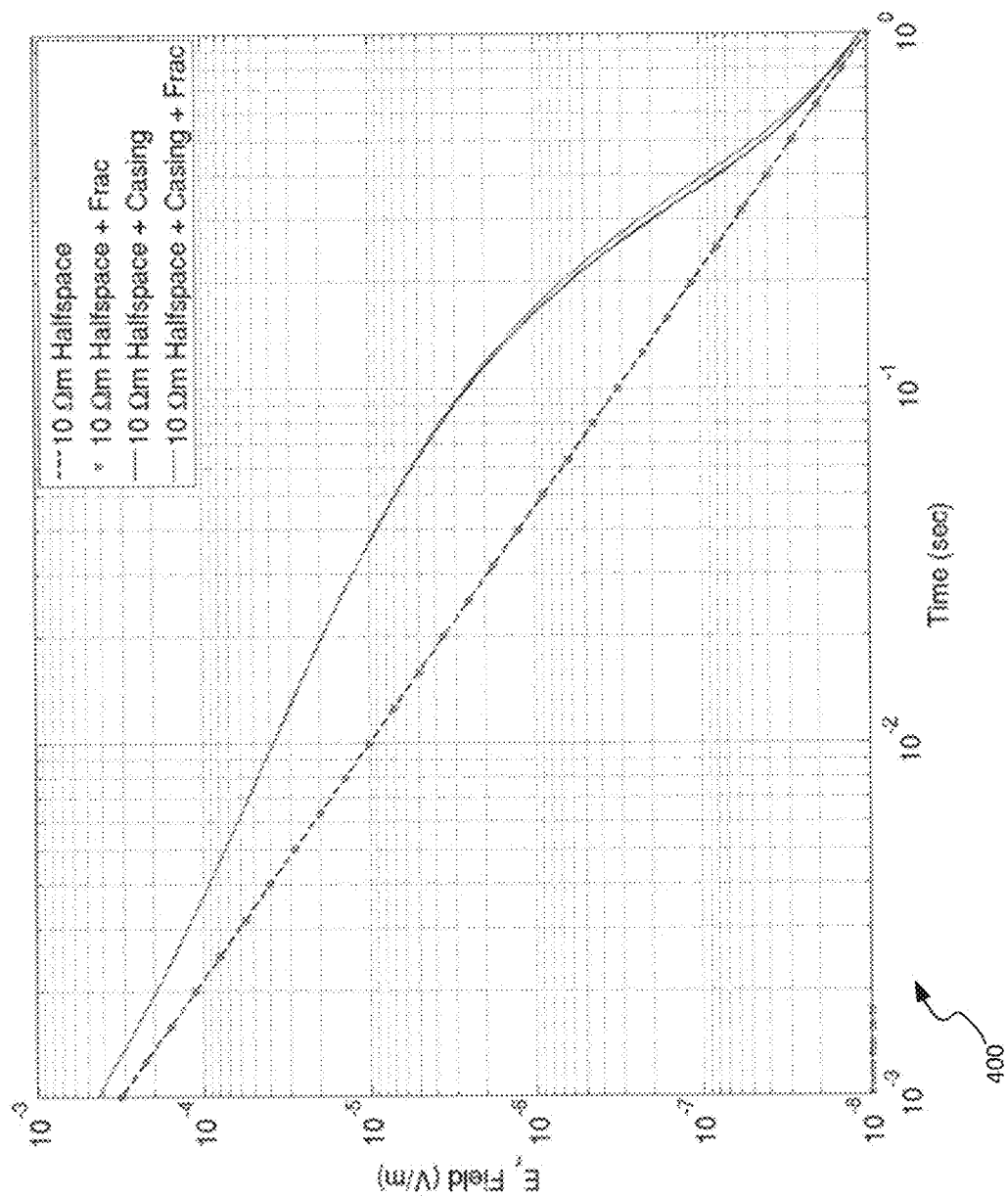
FIG. 5 is a chart of a numerical simulation of the electrical field measurement over a hydraulic fracturing site using the measurement arrangement of FIG. 2, The dashed curves show the pre- and post frac responses of the fracture if the electromagnetic coupling effects of the steel well casing are not included. The solid curves show the pre- and post-frac responses of the created fracture with the electromagnetic coupling effects of the steel well casing included. This illustrates the necessity of being able to accurately model the electromagnetic coupling of the steel cased wells.
Figure 6:
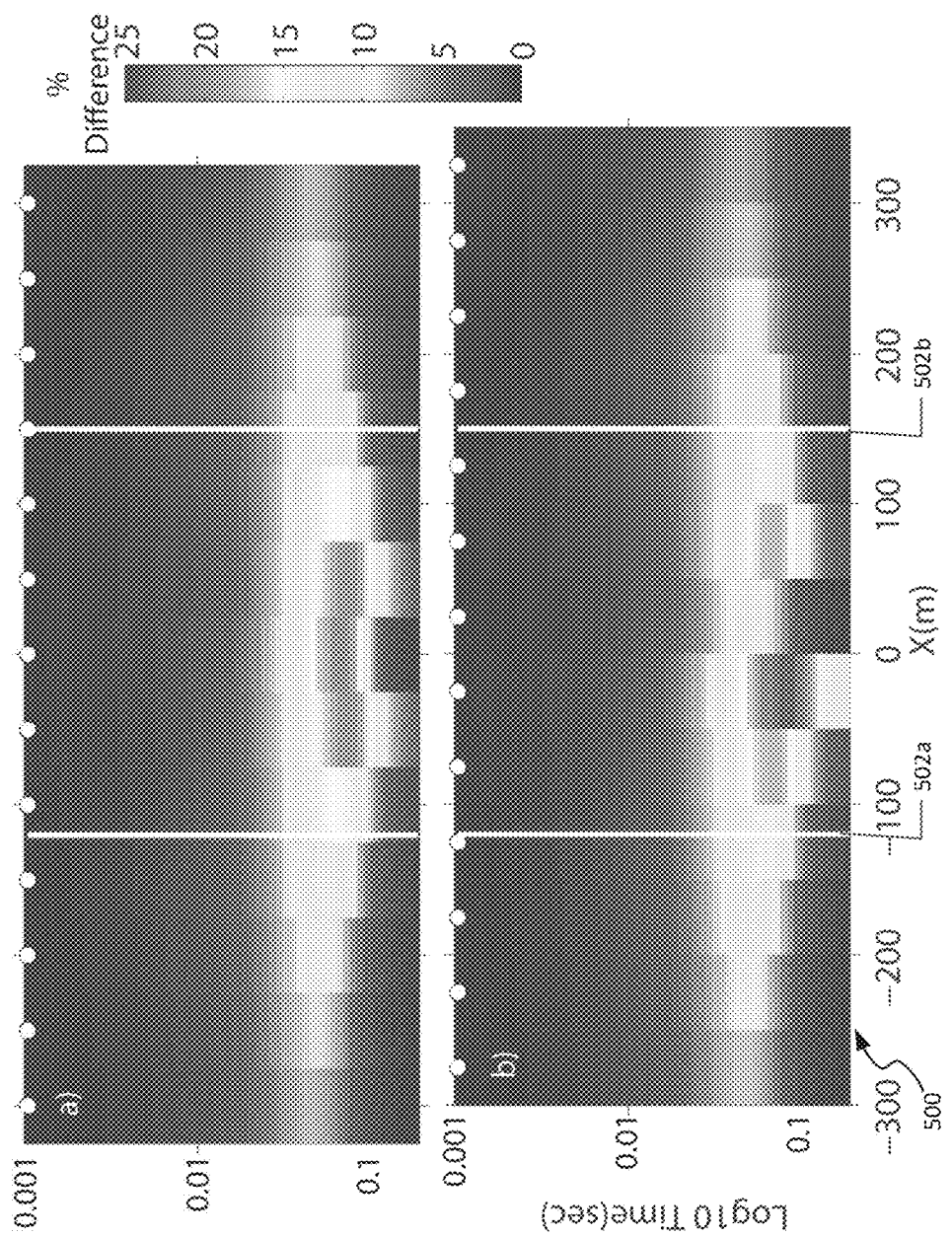
FIG. 6 is the calculated percent difference between the before and after radial E measurements over a frac with dimensions 270 m×90 m×0.01222 m. The frac has conductivity 526 S/m in a 10 Ωm background. Thirteen source-receiver pairs are used with a constant X direction source-receiver offset of 0 m for panel a) and +50 m for panel b). The line of receivers is at y=10 m. The sources are centered every 50 m from −300 m to +300 m. The percent difference at the midpoint between source and receiver colors each cell. The cell dimensions are the time and space increments of the data. The vertical white lines show the lateral extent of the simulated frac (−120 to +150 m). The maximum % difference is 20.3% for 0 X separation and 23.6% for +50 m X separation, illustrating an example fracture zone detected using the measurement arrangement of FIG. 2.
Figure 7:
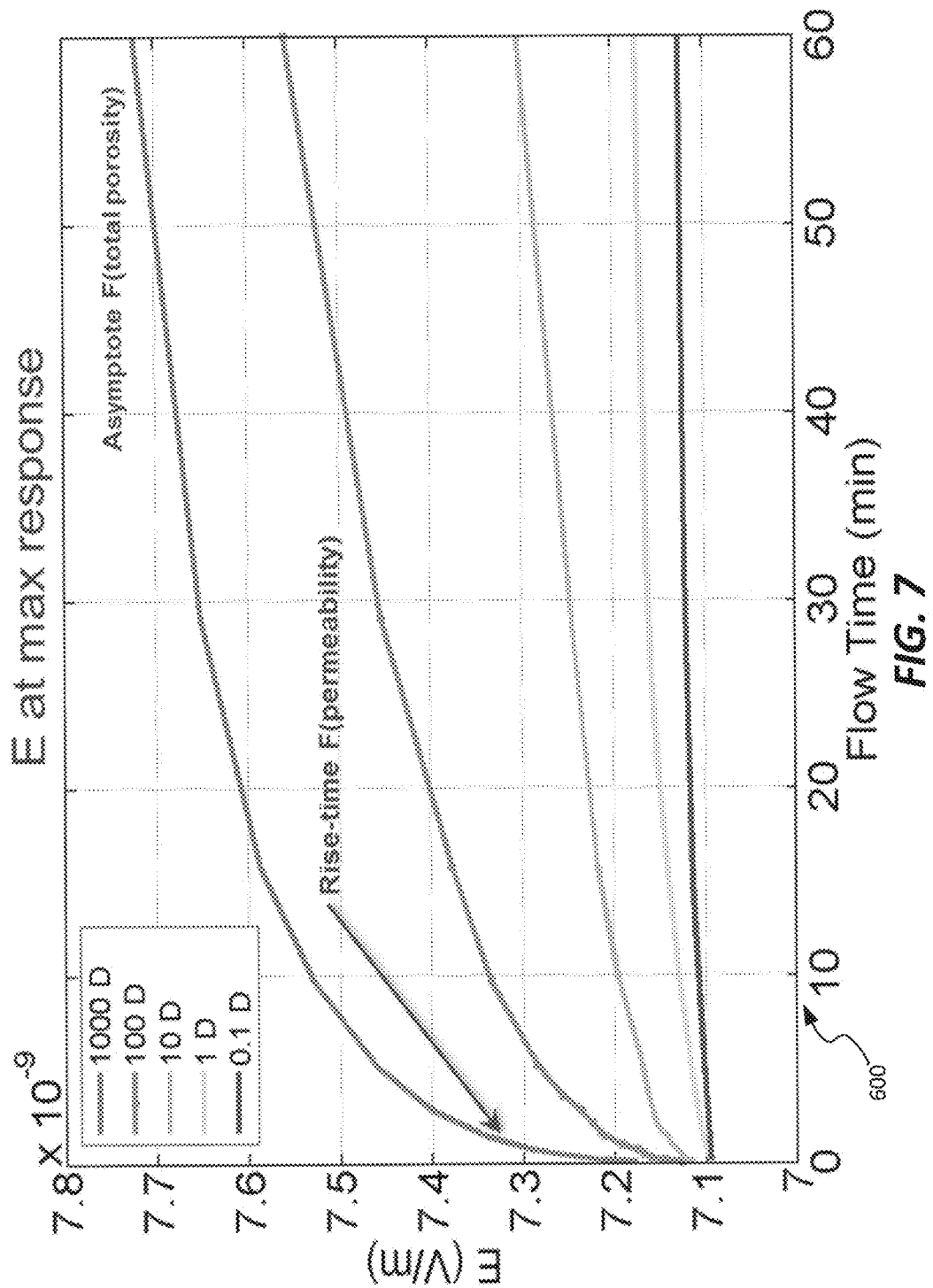
FIG. 7 is a chart illustrating the electrical field amplitude chosen at the time in the inactive portion of the waveform where the fracture response is a maximum (0.28 seconds after turn off in this example) as a function of the injection time. The five curves represent different hydraulic flow permeabilities of a created fracture zone. The rise time of the electric field is proportional to the effective permeability of the fracture zone and the asymptotic value of the electric field amplitude is proportional to the total porosity created, according to one example experimental arrangement.

Referring now to FIGS. 5-7, further details regarding a specific use of EM data is provided, in accordance with example charts are illustrated in which electromagnetic fields (e.g., electrical fields) are measured, using the surface receiver-transmitter arrangement illustrated in FIG. 2. In particular, for a line of grounded electric dipole sources on the surface run parallel to the assumed fracture direction electric fields are measured. The electric dipole source is assumed to be 50 m long and is energized by a generator creating a square wave of current with equal on and off times, as noted above. The electric fields are measured at some distance away from the transmitter in the off-time of the transmitters. In the example used in FIGS. 5-7, a ground with average electrical resistivity of 10 Ωm is assumed, which is representative of many shale formations where hydraulic fracturing is performed.

FIG. 5 is a chart 400 of a measured electrical field measurement over a hydraulic fracturing site, including a measureable response from a casing in a hydraulic fracture zone, using the measurement arrangement of FIG. 2. A key element for using surface based electric field measurements is being able to model the effects of the steel well casings that are present. Specifically, in FIG. 5, a receiver located at x=10 m, y=10 m with the well at the origin from a 50 m long grounded electric dipole transmitter that straddles the well in the y=0 plane is illustrated. Additional details regarding this figure are provided in the publication: Hoversten, G. M et al., 2015, Hydro-frac Monitoring Using Ground Time-domain Electromagnetics, Vol. 63 Issue 6, pp. 1508-1526, the disclosure of which is hereby incorporated by reference in its entirety.

In the example chart 400 (FIG. 5) as shown, the dashed lines are the response when the well casing is not modelled and the solid lines are the response when the well casing is included. The casing creates a measurable response from the hydraulic fracture zone and must be modelled for the system to be able to interpret data over such fractures.

FIG. 6 illustrates a chart 500 illustrating a percentage difference between measured electrical field measurements before and after a hydraulic fracturing operation is performed, illustrating an example fracture zone detected using the measurement arrangement of FIG. 2. In particular, the chart 500 shows a time-pseudo section for the percent difference between before and after fracture where seven source-receiver pairs with a +50 m separation are used over the hydraulic fracture in a 10 $\Omega$m background ground resistance. The transmitters in this case are centered on −300, −200, −100, 0, 100, 200, and 300 m at y=0. The line of receivers is run at y=+10 m to avoid the well pad (e.g., pad 107, of FIG. 1). In the embodiment shown, the lateral extend of the hydraulic fracture is shown by the vertical lines 502a-b. The maximum % difference is 20.3% for 0 X separation and 23.6% for +50 m X separation. The asymmetry in the hydraulic fracture extent about the well is seen in the asymmetry of the percent difference about the center (i.e., at the well bore location). In particular, for the source-receiver separation of 50 m (bottom panel FIG. 6) the asymmetry in the % difference on either side of the well is 10% demonstrating that the measured data has sensitivity to the asymmetric spatial extend of the fracture zone.

FIG. 7 is a chart 600 illustrating an electrical field amplitude relative to an injection time, according to one example experimental arrangement. This experimental arrangement was performed using a flow simulator coupled to a 3D EM code to simulate the EM responses on the surface as fluid flows in a zone of varying permeability. The flow simulator is used to calculate the spatial distribution of injected fluid in a horizontal zone of 10 m thickness at a depth of 2 km. In the simulation represented by chart 600, the injection of brine with 100,000 PPM NaCl for 60 minutes (a typical hydraulic fracture duration). The electrical conductivity of the brine is 30 S/m. There is an 50 m long electric dipole source pointing at the well on the ground surface 200 m away from the borehole and an array of electric field receivers around the borehole, in this example. The permeability of the horizontal layer is varied between 0.1 and 1000 Darcy's (D). In addition to the fracture zone spatial information contained in the surface E fields, the change of the E fields during the fracture pumping is proportional to the effective permeability of the created fracture zone.

During the simulated 60 minutes of injection, the transmitter is continuously putting out an equal on and off square wave of electric current into the earth, as noted above. The receivers are continuously monitoring the electric field in the off-time (inactive phase) of the transmitter. The decay of the electric field in the off-time of the transmitter looks like the solid lines in FIG. 5. As the simulated fracture grows the difference between the E fields before the frac and the E field measured as the frac grows changes, with a maximum difference occurring at 0.28 seconds after turn off for this example. The time of maximum response is dependent on the electrical resistivity of the ground and the depth to the target fracture zone.

FIG. 7 shows, in chart 600, that the amplitude of the measured electric field as a function of the pumping time for fracture zone permeability of 0.1 D, 1 D, 100 D, and 1000 D. The curves have two regions; 1) the early time with a sharp increase in the electric field amplitude and 2) the later time where the electric field amplitude asymptotes. In the early time as the fracture zone is filled with the conductive fluid the rise of the electric field amplitude is proportional to the permeability of the fracture zone (higher permeability allows the fracture zone to fill more rapidly). At the late time as the fracture zone becomes completely filled the asymptotic electric field amplitude is proportional to the total created porosity of the fracture zone (higher created porosity creates higher electrical conductivity of the fracture zone resulting in larger electric fields measured at the surface).

One factor affecting the results illustrated in FIG. 7 is that the rate of electric field increase versus the pumping time is different for different permeabilities of the fracture zone. Accordingly, the rate of change of the measured electric field on the ground surface above the hydraulic fracturing operation is a function of the created permeability of the fracture zone.

Referring to FIGS. 1-7 generally, it is noted that measured electric fields on the earth's surface for hydraulic fracturing at commercial depths contain two critical pieces of information; 1) the spatial dimensions of the fracture zone containing the injected fluid, or conductively enhanced proppant, and 2) the effective permeability of the created fracture zone. Accordingly, the measured electric fields can be measured to further refine a system for monitoring hydraulic fracturing, using 1) a system for generating and measuring electric fields, 2) a EM numerical modeling code capable of accurately modeling the effects of steel casing, and 3) inversion software capable of coupling hydraulic flow and electromagnetic measurements to produce 3D volume estimates of the fracture zone and its effective permeability.

Referring generally to the systems and methods of FIGS. 1-7, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems. For example, in yet another embodiment the present disclosure may include a computer-readable storage device comprising computer-executable instructions which, when executed by a computing system, cause the computing system to perform a method comprising associating hydraulic flow parameters with electromagnetic signal measurements of a subsurface hydraulic fracture location to determine one or more fracture zones and determining an effective permeability of the one or more fracture zones, thereby determining an effectiveness of hydraulic fracturing in the subsurface hydraulic fracture location.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 200, above. Computer storage media does not include a carrier wave or other propagated or modulated data signal. In some embodiments, the computer storage media includes at least some tangible features; in many embodiments, the computer storage media includes entirely non-transitory components.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method of characterizing subsurface hydraulic fractures by determining an effective permeability of one or more fracture zones, the method comprising:
   transmitting electromagnetic signals from an electromagnetic source toward a subsurface hydraulic fracture location;
   capturing electromagnetic signal measurements on the earth's surface above the subsurface hydraulic fracture location at a plurality of electromagnetic receivers at a plurality of different locations along an earth surface spaced at different distances from a hydraulic fracturing surface site;
   applying an inversion to the electromagnetic signal measurements and hydraulic flow data to determine a fracture model, the hydraulic flow data including injection pressure and injection volume, wherein the fracture model comprises a three dimensional model constrained to locations at which the electromagnetic signal measurements are detected; and
   predicting a stimulated reservoir volume formed based on the inversion volume of hydraulic permeability.

2. The method of claim 1, wherein the electromagnetic source includes a plurality of electromagnetic signal transmitters positioned with ground points for the transmitter to inject electric current into the earth from a combination of locations, including the earth surface and/or down boreholes.

3. The method of claim 1, wherein transmitting electromagnetic signals from an electromagnetic source toward a subsurface hydraulic fracture location comprises generating an electric current waveform in the transmitter so as to produce an electromagnetic signal including an active phase and an inactive phase.

4. The method of claim 3, wherein capturing electromagnetic signal measurements occurs during the inactive phase of the current wave form generated electromagnetic signal.

5. The method of claim 1, wherein the electromagnetic signal measurements are also captured at a plurality of electromagnetic receivers in adjacent boreholes.

6. The method of claim 1, wherein the inversion is applied on a combination of an electrical conductivity model and a flow model, and wherein the combination is made between flow permeability and porosity.

7. The method of claim 1, wherein capturing the electromagnetic signal measurements occurs during an inactive phrase of a current wave form included in the electromagnetic signals.

8. A system for characterizing subsurface hydraulic fractures, the system comprising:
   an electrical field generation and measurement subsystem including an electromagnetic transmitter and a plurality of electromagnetic sensors located at plurality of different locations along an earth surface spaced at different distances from a hydraulic fracturing surface site;
   an electromagnetic numerical modeling system implemented on a computing system and configured to apply an inversion to electromagnetic signal measurements received at the electromagnetic sensors and hydraulic flow data to determine a fracture model, the hydraulic flow data including injection pressure and injection volume, wherein the fracture model comprises a three dimensional model constrained to locations at which the electromagnetic signal measurements are detected;
   wherein the electromagnetic numerical modeling system further is configured to predict a stimulated reservoir volume formed based on the inversion volume of hydraulic permeability.

9. The system of claim 8, wherein the electrical field generation and measurement subsystem includes a plurality of electromagnetic signal transmitters.

10. The system of claim 9, wherein at least one of the plurality of electromagnetic signal transmitters is located at the earth's surface.

11. The system of claim 8, wherein the electrical field generation and measurement subsystem includes a signal generator configured to generate an electromagnetic signal including an active phase and an inactive phase.

* * * * *